March 8, 1938.  G. G. HAVENS  2,110,224

METHOD OF MAKING RUBBER ARTICLES

Filed Aug. 13, 1936   2 Sheets-Sheet 1

INVENTOR.
Glenn G. Havens
BY Walter L. Piper
ATTORNEY.

March 8, 1938.  G. G. HAVENS  2,110,224
METHOD OF MAKING RUBBER ARTICLES
Filed Aug. 13, 1936  2 Sheets-Sheet 2

INVENTOR.
Glenn G. Havens
BY Walter L. Pipes
ATTORNEY.

Patented Mar. 8, 1938

2,110,224

UNITED STATES PATENT OFFICE 2,110,224

METHOD OF MAKING RUBBER ARTICLES

Glenn G. Havens, Detroit, Mich., assignor to United States Rubber Products, Inc., New York, N. Y., a corporation of Delaware Application August 13, 1936, Serial No. 95,807

10 Claims. (Cl. 18—53)

This invention relates to a process of improving the physical properties of vulcanized rubber articles generally, and especially tires, and also to the improved rubber products resulting therefrom. It aims to provide rubber products which are less susceptible to cracking. It further aims to improve the flexing resistance of vulcanized rubber products. It further aims to provide a tire, the bottoms of the grooves of the antiskid configuration of which are substantially more resistant to cracking; also a tire in which the side walls are more resistant to cracking.

These are some of the objects of the invention. Other objects will appear hereinafter.

This application is a continuation-in-part of my application Serial No. 32,984, filed July 25, 1935.

Rubber is more susceptible to deterioration while it is in a state of tension than when it is in a normal condition, that is, relaxed, or than when it is in a state of compression. It is believed that ozone in the air aggravates deterioration. The rate of deterioration caused apparently by ozone is apparently augmented when the rubber is under tension. Apparently the ozone progressively effects a separation of the particles of the rubber from the surface inwardly and thereby cracking results, as, for instance, seen in the grooves of the treads and on the side walls of pneumatic tires.

In pneumatic tires, to which the invention is particularly applicable, tension is developed to a minor extent by the inflating pressure which stretches the rubber at the bottoms of the grooves defining the antiskid configurations and to a major extent at the rolling points of contact of the tires with the road in advance and in the rear of the constantly shifting area which is in direct engagement with the road. At these points the rubber is progressively bent or folded, the radius of curvature being less there than elsewhere, either where the tire is flat against the road or throughout the rest of the circumference where the tire is approximately of its normal molded curvature or shape. It is the repeated and incessant flexing of the tire in changing from its normal shape to a flat shape where it actually engages the road surface which produces tension in the rubber and which is believed to make the pneumatic tire susceptible to cracking.

By the present invention cracking may be substantially reduced or minimized. This may be done variously and by various means. In the case of pneumatic tires the tendency of cracking at the base of the grooves defining the antiskid configurations may be reduced by deforming the tire so as to cause the grooves to flare and thereby to tension or stretch the rubber at the bases of the grooves and, while the bases of the grooves are in a state of tension, subjecting the tire to an elevated temperature for a short time. The side walls of the tires may also be rendered resistant to cracking by being placed in a state of tension and subjecting their surfaces to an elevated temperature for a short time. The heat treatment may be effected by a suitable heating medium such as hot air, steam, or superheated steam. The heat treatment should be such as to relieve the tension that has been created in the vulcanized rubber article by the deformation, or at least the greater portion of such tension and to a depth of the order of .04 of an inch, at least in the case of pneumatic tires.

In the case of pneumatic tires it is desirable, in order not to impair the wear-resisting characteristics or the appearance of the vulcanized rubber product, to localize or confine the heat treatment to the regions which are to be rendered resistant to cracking. In the case of tires, and particularly pneumatic tires, these regions are the bottoms of the grooves defining the antiskid configurations or the side walls. It is recommended generally that in practicing this invention superheated steam be employed and led by nozzles to the bottoms of the grooves which are to be rendered resistant to cracking and/or confined to the side walls. In this way the exact shape and configuration of the tread which has been molded to a desired antiskid configuration may be preserved accurately and sharply and there will be no appreciable or deleterious impairment of the wear-resisting characteristics of that portion of the rubber which constitutes the antiskid configurations proper.

Embodiments of the invention are illustrated in the accompanying drawings, in which:—

Figure 1:
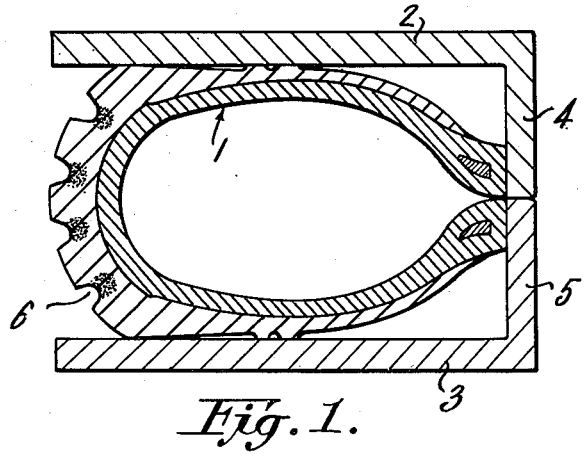
Fig. 1 is a cross section of a tire deformed to produce tension at the bottoms of the grooves in the tread.

In the drawings there is illustrated one of the many possible ways in which the process of this invention may be practiced. In these the treatment of a tire is disclosed but it is to be understood that the invention in its broad aspect at least is applicable to the treatment of other vulcanized rubber products, such for instance as rubber footwear, belting, or in fact any rubber product where cracking may occur to an undesirable extent.

Figure 2:
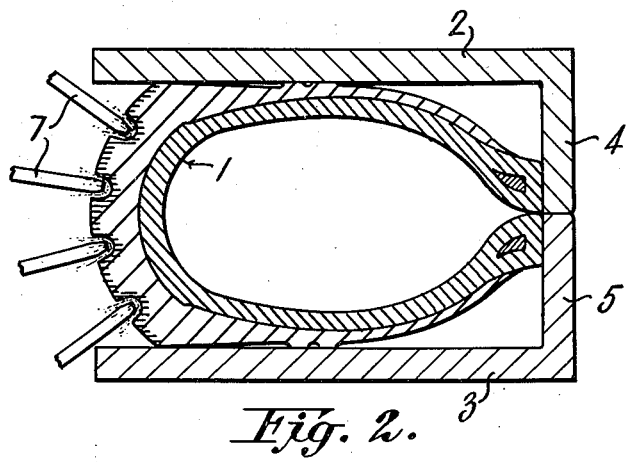
Fig. 2 is a similar view showing the tire being subjected locally to heat treatment by nozzles confining the heating medium to the bottoms of the grooves.
Figure 3:
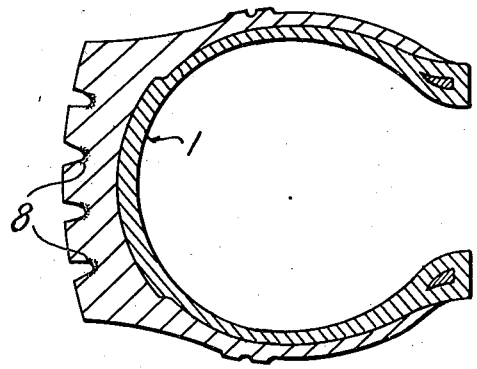
Fig. 3 is a cross section of the finished tire after it has been allowed to assume its normal vulcanized shape.

Referring to Figs. 1, 2, and 3 of the drawings, the pneumatic tire casing indicated generally by the numeral 1 is shown with its side walls clasped between plates 2 and 3 which are flanged inwardly at their inner circumferences as indicated at 4 and 5, respectively. This results in making the grooves 6 in the tread flare outwardly and produce tension in the rubber at the bottoms of these grooves. While so held steam, and preferably superheated steam, at a temperature of around 550 degrees Fahrenheit for a period of around 20 seconds is directed through a multiplicity of nozzles 7, or other suitable means, to the bottoms of the grooves. Under this treatment the greater portion of the tension strains at the bases of the grooves are relieved and to a depth approximately .04 of an inch. The tire is then cooled down, and desirably this should be done rapidly as by a stream of cold water.

On removal of the tire from the clamping plates 2 and 3 it assumes the normal form in which it was vulcanized, as illustrated in Fig. 3, and in regaining its form it will be put in a state of compression at the zones indicated by the numeral 8 in Fig. 3. The creation of these zones of compression at the bottoms of the grooves renders them substantially more resistant to cracking as has been established by tests. For instance, pads of rubber were made up in a form simulating the grooved tread of a pneumatic tire. Both of these were cured alike. One of these was treated in accordance with the principles of this invention and the other was not. Both were subjected to bending tests, but the untreated pad showed cracking after 240,000 bending cycles whereas the treated pad showed no signs of groove cracking after 1,000,000 bending cycles. These bending tests which were made in the factory under laboratory conditions were confined by service tests made on identical tires, some treated according to the present invention and others not. It was thus established that the invention substantially reduces the cracking tendency.

Figure 4:
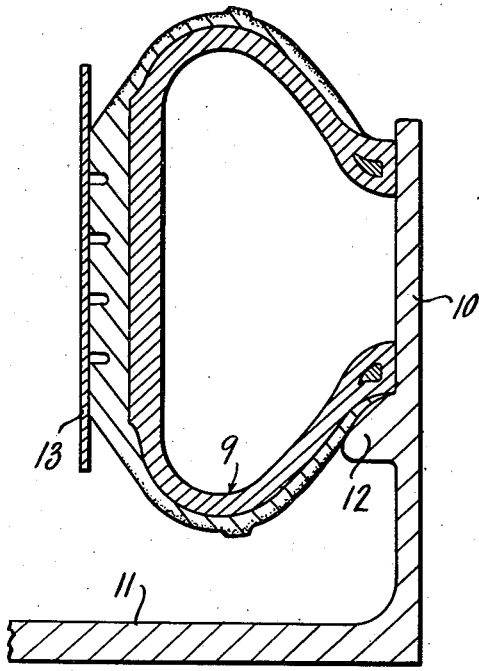
Fig. 4 is a section of a tire deformed so as to produce tension in its side walls.
Figure 5:
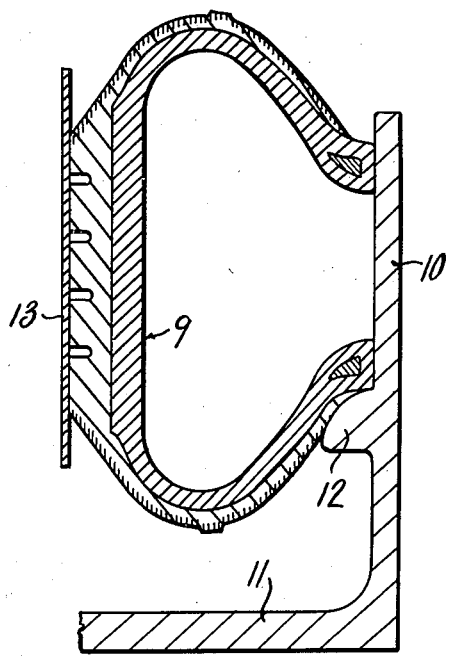
Fig. 5 is a similar view diagrammatically illustrating the application of heat to the side walls of a tire while under tension.

In applying the invention to the treatment of the side walls of pneumatic tire casings a variety of expedients are obviously available. In Figs. 4 and 5 a simple means is shown for deforming the side walls of casings, one of which is indicated by the numeral 9, and placing their external surfaces under tension. This means comprises an annular rim 10 suitably supported in any convenient manner as by a base plate 11, the rim 10 having a flange 12 for engaging one of the beaded margins of the tire casing. Around the tread portion of the casing 9 are positioned a plurality of arcuate sections 13 which may be held in any convenient manner (not shown) so as to effect a bulging of the side walls of the casing. Thereby the surface of these side walls is placed in a state of tension. In such condition, and while the sections 13 exclude heat from reaching the wear surface of the tread to a deleterious extent, the casing is subjected to a short heat treatment at an elevated temperature in order to permit the vulcanized rubber composition to change its state and become more or less thermoplastic thereby freeing the rubber of tension superficially, to a depth of say .04 of an inch. While any suitable and convenient means may be used to give the side walls of the casing this brief and elevated heat treatment, it may be done by positioning the assemblage illustrated in Fig. 4 in a chamber filled with hot air, or hot water, or steam. Superheated steam at a temperature of around 550 degrees Fahrenheit is preferred and for a period of time of around 20 seconds and directed upon the side walls where resistance to cracking is to be improved. Of course, the steam may be applied by spraying it through a multiplicity of nozzles directly on the side walls of the casing.

In Fig. 4 the casing is illustrated with its side walls in a tensioned condition. In Fig. 5 the casing is illustrated after the heat treatment has been applied and the tension condition in the side walls relieved.

Figure 6:
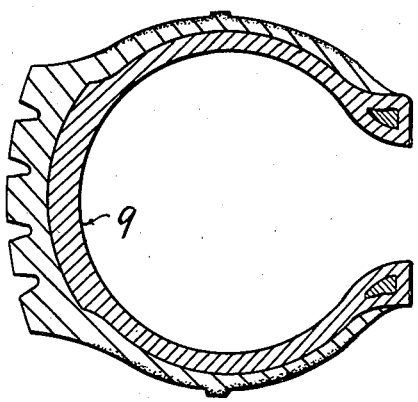
Fig. 6 is a cross section of a tire in its normal shape after its side walls have been heat-treated to render them resistant to cracking.

In Fig. 6 the tire is shown in the normal position it assumes after being allowed to assume its normal shape which is substantially identical to its original shape when removed from the vulcanizing mold prior to the application of the treatment of this invention.

The temperature and duration of the heat treatment after vulcanization to which the tire casing, or other vulcanized rubber article, is subjected, will vary with the composition of the stock and the degree of compression it is desirable to develop in a zone or zones of the article to offset the particular liability of cracking or deterioration to which the tire or other article is susceptible without the treatment of this invention. Generally, the higher the temperature of the heating medium applied the shorter need be the duration of its application. Generally, of course, the shorter the duration of the heat treatment the greater the speed and economy of production.

It is deemed preferable to cool the tire properly after its brief heat treatment, as by spraying it with cold water, or introduction into a chamber maintained at below room temperature, or otherwise as may be convenient, but for some purposes rubber products after the treatment of this invention may be allowed to cool down as they will at room temperature.

It is to be distinctly understood that the illustration given of a brief heat treatment at 550 degrees Fahrenheit for 20 seconds is not critical or indispensable as to either the degree of heat or its duration. Any degree and any length of time may be employed for treating the vulcanized rubber product which will enable the desired portion or portions of the surface of the rubber article to be transformed from the condition which they normally have on being finally vulcanized in their manufacture to a condition in which the portion or portions are superficially (to a depth of a few thousandths of an inch) placed in a state of compression and thereby rendered more resistant to cracking. It is believed that cracking, as before stated, is due primarily to the accelerated action of ozone on rubber in the state of tension, as distinguished from rubber in its normal state or in a state of compression.

By this invention zones of the rubber product are superficially indurated and cracking to a substantial extent is minimized.

The invention is intended for particular application to newly vulcanized rubber articles but, of course, may be applied with some advantage to old products.

While the invention has been described with particular reference to a field of large applications, to wit, the manufacture of tires, and especially pneumatic tires, it is obviously susceptible of application to other rubber products.

The underlying principle of the invention is to render a zone or area of the rubber article less susceptible to cracking by placing the rubber at and immediately adjacent the surfaces of a zone or any other area of the article in a state of compression in which normally at least the state of compression is maintained by the rest of the material, whether it be rubber alone, or rubber and fabric; or other materials of which the article is made. In pneumatic tires the invention has specific applicability to the base of the grooves defining the antiskid configuration, whether that configuration be continuous ribs or a series of tread projections, blocks or the like, or a combination of ribs and blocks. The invention may be practiced not merely as detailed with respect to treating the base of the groove defining the antiskid configuration of the tire by means of nozzles directing the heating medium to the bottoms of the grooves, but it broadly comprehends the brief heat treatment at elevated temperatures of an already vulcanized article in zones or areas where cracking is likely or objectionable. Any suitable and convenient method and apparatus may be employed to heat-treat the article to obtain a product of this invention. Reference should therefore be made to the accompanying claims for an understanding of the scope of the invention.

Having thus described my invention, what I claim and desire to protect by Letters Patent is:—

1. In the method of treating rubber, the steps comprising vulcanizing a body of rubber, stretching at least a portion of the surface thereof, applying heat to the stretched surface to render plastic a thin layer of rubber, permitting the plastic rubber to set over the underlying stretched rubber of the body, and releasing the stretched body whereby the thin re-set layer is placed under compression.

2. In the method of treating a tire comprising a carcass of strain-resisting elements and a rubber tread having a traction groove therein, the steps comprising initially vulcanizing the tire, stretching the rubber transversely at the bottom of the tread groove, applying heat to the stretched rubber to cause a thin layer of the rubber at the bottom of the tread groove to become plastic, permitting the plastic rubber to re-set to approximately its original state of resiliency over the stretched inner rubber, and releasing the stretched rubber whereby the layer of re-set rubber at the bottom of the tread groove is placed under compression.

3. In the method of treating a tire comprising a carcass of strain-resisting element and a rubber tread having a traction groove therein, the steps comprising initially vulcanizing the tire, stretching the rubber transversely at the bottom of the tread groove, applying steam to the stretched rubber to cause a thin layer of the rubber at the bottom of the tread groove to become plastic, permitting the plastic rubber to re-set to approximately its original state of resiliency over the stretched inner rubber, and releasing the stretched rubber whereby the layer of re-set rubber at the bottom of the tread groove is placed under compression.

4. In the method of treating a tire comprising a carcass of strain-resisting elements and a rubber tread having a traction groove therein the steps comprising initially vulcanizing the tire, stretching the rubber transversely at the bottom of the tread groove, applying steam at a temperature of about 550 degrees Fahrenheit to the stretched rubber to cause a thin layer of the rubber at the bottom of the tread groove to become plastic, permitting the plastic rubber to re-set to approximately its original state of resiliency over the stretched inner rubber, and releasing the stretched rubber whereby the layer of re-set rubber at the bottom of the tread groove is placed under compression.

5. In the method of treating a tire comprising a carcass of strain-resisting elements and a rubber tread having a traction groove therein, the steps comprising initially vulcanizing the tire, stretching the rubber transversely at the bottom of the tread groove, applying steam at a temperature of about 550 degrees Fahrenheit for a period of around 20 seconds to the stretched rubber to cause a layer of the rubber of the order of .04 inch in thickness at the bottom of the tread groove to become plastic, permitting the plastic rubber to re-set to approximately its original state of resiliency over the stretched inner rubber, and releasing the stretched rubber whereby the layer of re-set rubber at the bottom of the tread groove is placed under compression.

6. In the method of treating rubber, the steps comprising initially vulcanizing a body of rubber composition, creating tension strains in the rubber, rendering a layer at the exposed surface of the strained rubber plastic by the application of steam while retaining the inner rubber in a strained condition, stopping the application of the steam, permitting the plastic rubber to return to approximately its original state of resiliency and releasing the strains in the body of the rubber whereby the re-set rubber is subjected to strains of a character different from those of the adjacent rubber.

7. In the method of treating rubber, the steps comprising initially vulcanizing a body of rubber composition, creating tension strains in the rubber, rendering a layer at the exposed surface of the strained rubber plastic by the application of steam at a temperature of about 550 degrees Fahrenheit for a period of the order of 20 seconds while retaining the inner rubber in a strained condition, stopping the application of the steam, permitting the plastic rubber to return to approximately its original state of resiliency and releasing the strains in the body of the rubber whereby the re-set rubber is subjected to strains of a character different from those of the adjacent rubber.

8. In a method of treating a tire comprising an exposed body of vulcanizable rubber composition, the steps comprising vulcanizing the body of rubber, stretching at least a portion of the surface thereof, applying heat to the stretched surface to render plastic a thin layer of rubber, permitting the plastic rubber to return to its original state of resiliency over the underlying stretched rubber of the body, and releasing the stretched body whereby the resulting thin layer is placed under compression.

9. In the method of treating a body of vulcanized rubber, the steps comprising stretching the body of vulcanized rubber to create tension in an exposed surface, applying heat to the exposed surface to cause a thin layer of rubber at the surface to become plastic, permitting the plastic rubber to return to approximately its original state of resiliency, and releasing the strains in the body of rubber whereby the re-set layer of rubber is placed under compression, and the surface of the rubber is rendered resistant to cracking.

10. In a method of treating a tire comprising a side wall having an exposed body of vulcanized rubber composition, the steps comprising vulcanizing the rubber body, stretching at least a portion of the surface of the rubber body at the side wall of the tire, applying heat to the stretched surface to render plastic a thin layer of rubber, permitting the plastic rubber to re-set on the underlying stretched rubber of the body, and releasing the stretched body whereby the resulting thin rubber layer is placed under compression.

GLENN G. HAVENS.